(12) United States Patent
Kizaki

(10) Patent No.: US 11,061,565 B2
(45) Date of Patent: Jul. 13, 2021

(54) ELECTRONIC DEVICE AND CONTROL METHOD

(71) Applicant: TOSHIBA CLIENT SOLUTIONS CO., LTD., Tokyo (JP)

(72) Inventor: Shigeki Kizaki, Kunitachi Tokyo (JP)

(73) Assignee: Toshiba Client Solutions CO., LTD., Tokyo (JP)

(*) Notice: Subject to any disclaimer, the term of this patent is extended or adjusted under 35 U.S.C. 154(b) by 0 days.

(21) Appl. No.: 16/233,001

(22) Filed: Dec. 26, 2018

(65) Prior Publication Data

US 2020/0073550 A1 Mar. 5, 2020

(30) Foreign Application Priority Data

Aug. 31, 2018 (JP) .................. JP2018-162725

(51) Int. Cl.
   *G06F 3/0489* (2013.01)
   *G06F 3/0484* (2013.01)
   *G06F 3/0482* (2013.01)
   *G06F 3/0354* (2013.01)

(52) U.S. Cl.
   CPC ...... *G06F 3/04892* (2013.01); *G06F 3/04847* (2013.01); *G06F 3/03547* (2013.01); *G06F 3/0482* (2013.01)

(58) Field of Classification Search
   CPC .............. G06F 3/04892; G06F 3/04847; G06F 3/03547; G06F 3/0482; G06F 3/041
   See application file for complete search history.

(56) References Cited

U.S. PATENT DOCUMENTS

| | | | |
|---|---|---|---|
| 9,098,640 B2 | 8/2015 | Uehara | |
| 2007/0271608 A1* | 11/2007 | Shimizu | G06F 3/0482 726/17 |
| 2014/0249438 A1* | 9/2014 | Morikawa | G06F 3/015 600/521 |
| 2018/0173417 A1* | 6/2018 | Foresti | G06F 3/04886 |
| 2019/0281233 A1* | 9/2019 | Yorozu | H04N 5/2251 |

FOREIGN PATENT DOCUMENTS

| | | | | |
|---|---|---|---|---|
| JP | 2010-81559 A | | 4/2010 | |
| JP | 2017-117159 | | 6/2017 | |
| JP | 2018-078463 A | | 5/2018 | |
| JP | 2018078463 A | * | 5/2018 | ....... H04N 5/232933 |
| WO | WO 2016/175055 A1 | | 11/2016 | |

* cited by examiner

*Primary Examiner* — Alexander Eisen
*Assistant Examiner* — Cory A Almeida
(74) *Attorney, Agent, or Firm* — Knobbe, Martens, Olson & Bear, LLP

(57) ABSTRACT

According to one embodiment, an electronic device includes a first cursor button, a second cursor button, and a processor. The processor prompts a user to select a first direction by selecting one of the first cursor button or the second cursor button, and assigns the first direction to the first cursor button and a second direction to the second cursor button when the first cursor button is selected.

9 Claims, 13 Drawing Sheets

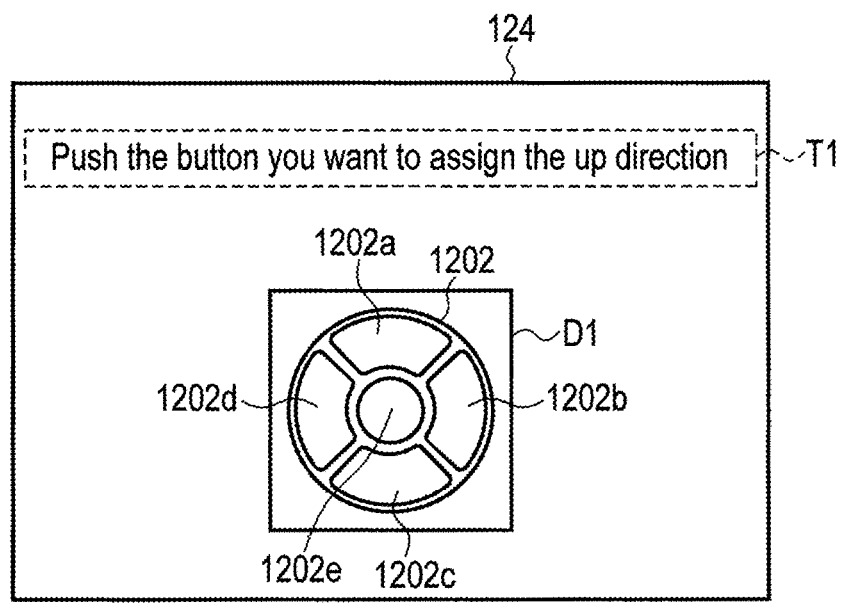
F I G. 11
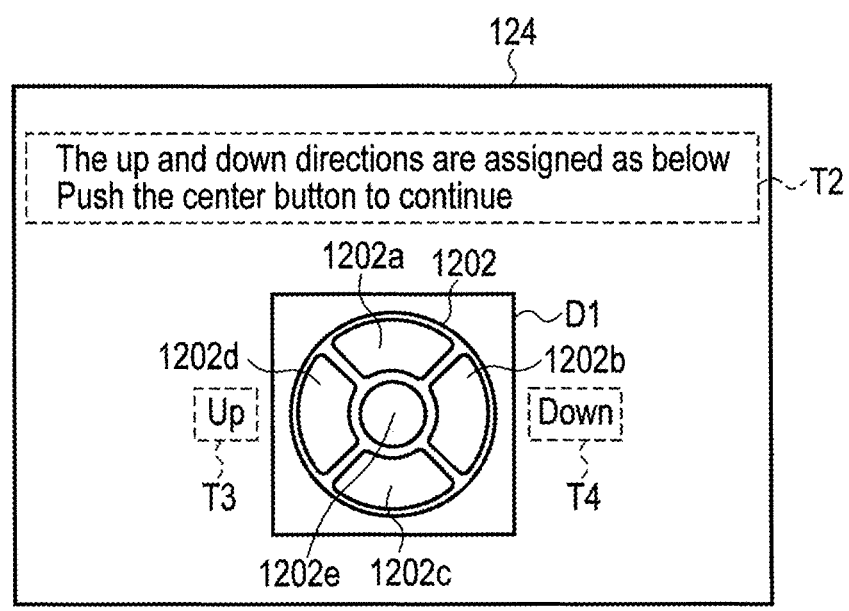
F I G. 12

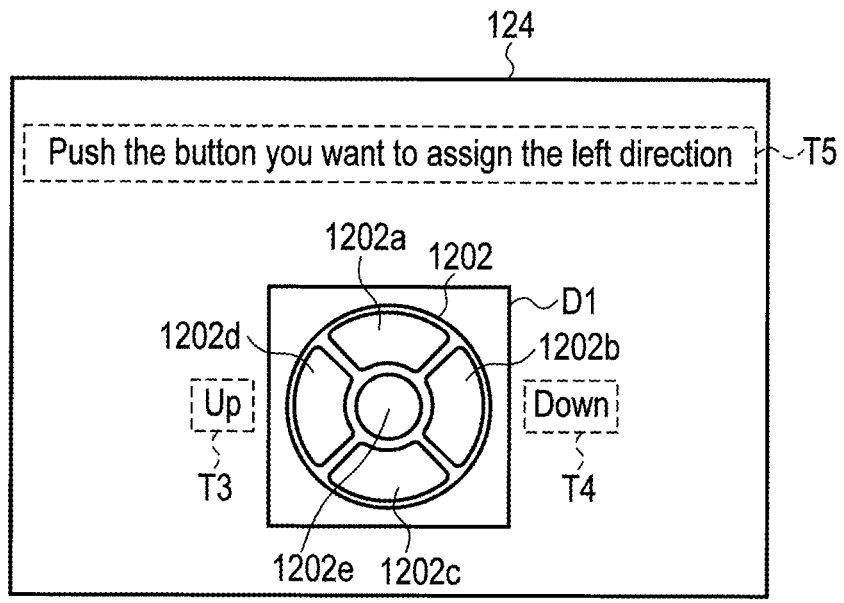
F I G. 13
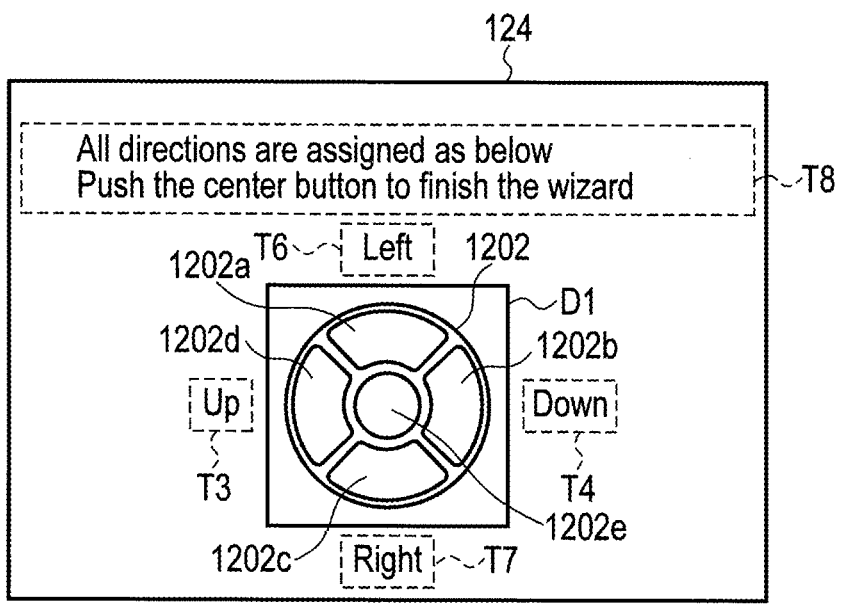
F I G. 14

ELECTRONIC DEVICE AND CONTROL METHOD

CROSS-REFERENCE TO RELATED APPLICATIONS

This application is based upon and claims the benefit of priority from Japanese Patent Application No. 2018-162725, filed Aug. 31, 2018, the entire contents of which are incorporated herein by reference.

FIELD

Embodiments described herein relate generally to an electronic device and a control method.

BACKGROUND

Recently, because of a trend of IoT which enables many things to be connected by the Internet, a technology called edge computing as a tool for network communication or information sharing has been required in offices, factories, and other various situations. In order to realize the edge computing, it is necessary to develop a practical mobile edge computing device of high versatility and high throughput, which can be used on-site by a user, separately from a data center (or a cloud). By the above, achieving work efficiency and productivity improvement at a workplace, etc., or realizing data load balancing or improving a network environment, and the like, is expected.

The user wears such a device on his/her body, and controls the device by operating a cursor key (a cursor button) provided on the device. However, since the device is attached to the user's body by changing the orientation depending on the user or the specifics of the work, physical up/down/right/left directions of the cursor buttons may be different from key codes assigned to the cursor buttons.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 11 is an illustration showing a first example of the cursor button orientation changing screen according to the first embodiment.

FIG. 12 is an illustration showing a second example of the cursor button orientation changing screen according to the first embodiment.

FIG. 13 is an illustration showing a third example of the cursor button orientation changing screen according to the first embodiment.

FIG. 14 is an illustration showing a fourth example of the cursor button orientation changing screen according to the first embodiment.

DETAILED DESCRIPTION

Figure 1:
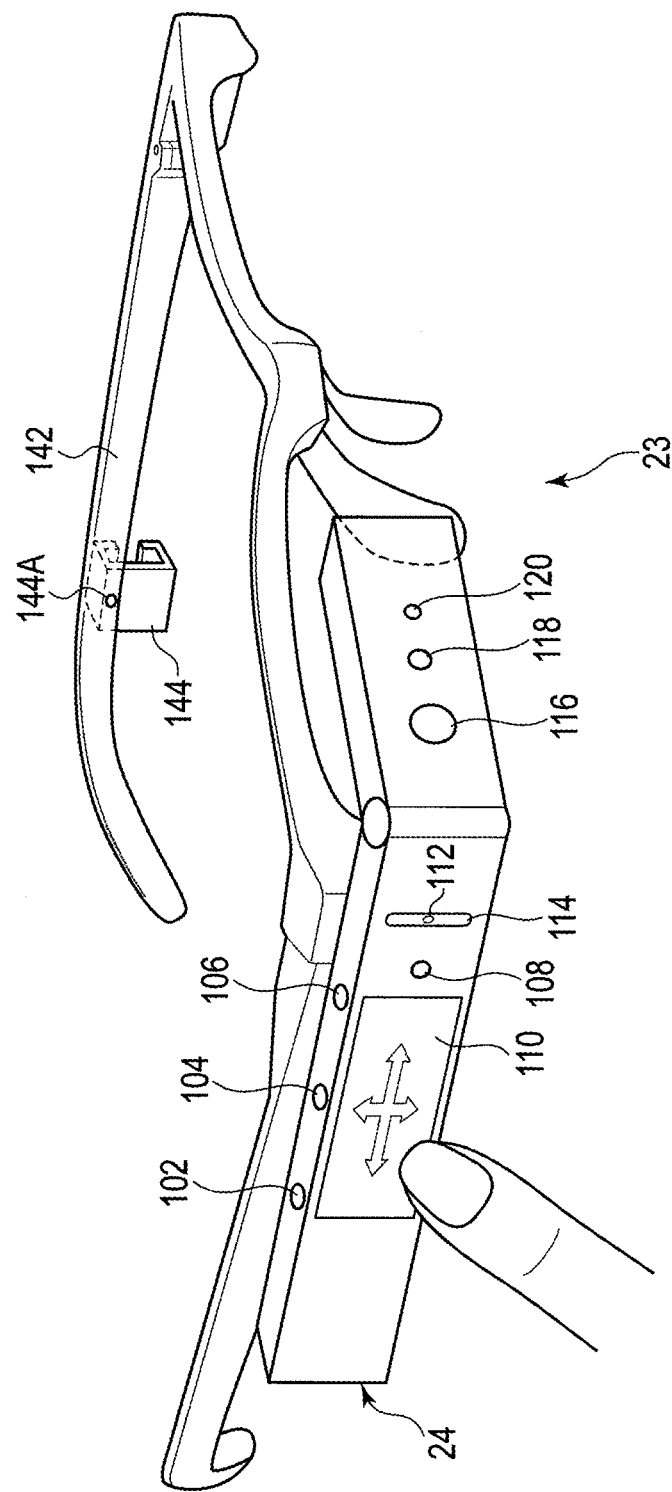
FIG. 1 is an illustration showing an example of an outer appearance of a wearable device 23.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an electronic device includes a first cursor button, a second cursor button, and a processor. The processor prompts a user to select a first direction by selecting one of the first cursor button or the second cursor button, and assigns the first direction to the first cursor button and a second direction to the second cursor button when the first cursor button is selected.

First Embodiment

A user at a workplace carries a mobile personal computer (PC) (also called a mobile edge computing device) described later and wears a wearable device 23 described later on his/her head. The wearable device 23 and the mobile PC 16 are connected to each other to enable communication between them.

The wearable device 23 includes a camera and a display device. For example, the wearable device 23 transmits images captured by the camera to the mobile PC 16 and displays images transmitted from the mobile PC 16 at the display device. Thus, the mobile PC 16 visualizes a field of view of the user and performs an image processing to the visual image to support field work of the user.

The mobile PC 16 can be connected to an operator terminal at a remote cite via a network. The user can receive support information from an operator.

Examples of field work include complicated maintenance work, picking work in a distribution warehouse, monitoring, disaster relief/medical support, and the like.

[Wearable Device 23]

FIG. 1 shows an example of an external appearance of the wearable device 23.

The wearable device 23 is formed of an eyeglass frame 142 and a wearable device body 24. The eyeglass frame 142 may have a shape obtained by removing lenses from general eyeglasses and is worn on the face of the user. The eyeglass frame 142 may have a structure to which eyeglasses can be attached. When the user habitually uses eyeglasses at all times, lenses of degrees identical to the habitually used eyeglasses may be attached to the eyeglass frame 142.

The eyeglass frame 142 is provided with mounting brackets 144 on both the right and left temples thereof. The wearable device body 24 is attached to and detached from one of the mounting brackets 144 on the right temple or the left temple. In FIG. 1, the wearable device body 24 is attached to the mounting bracket 144 on the right temple of the user so that the mounting bracket 144 on the right temple is hidden behind the wearable device body 24, and hence is not shown.

Figure 2:
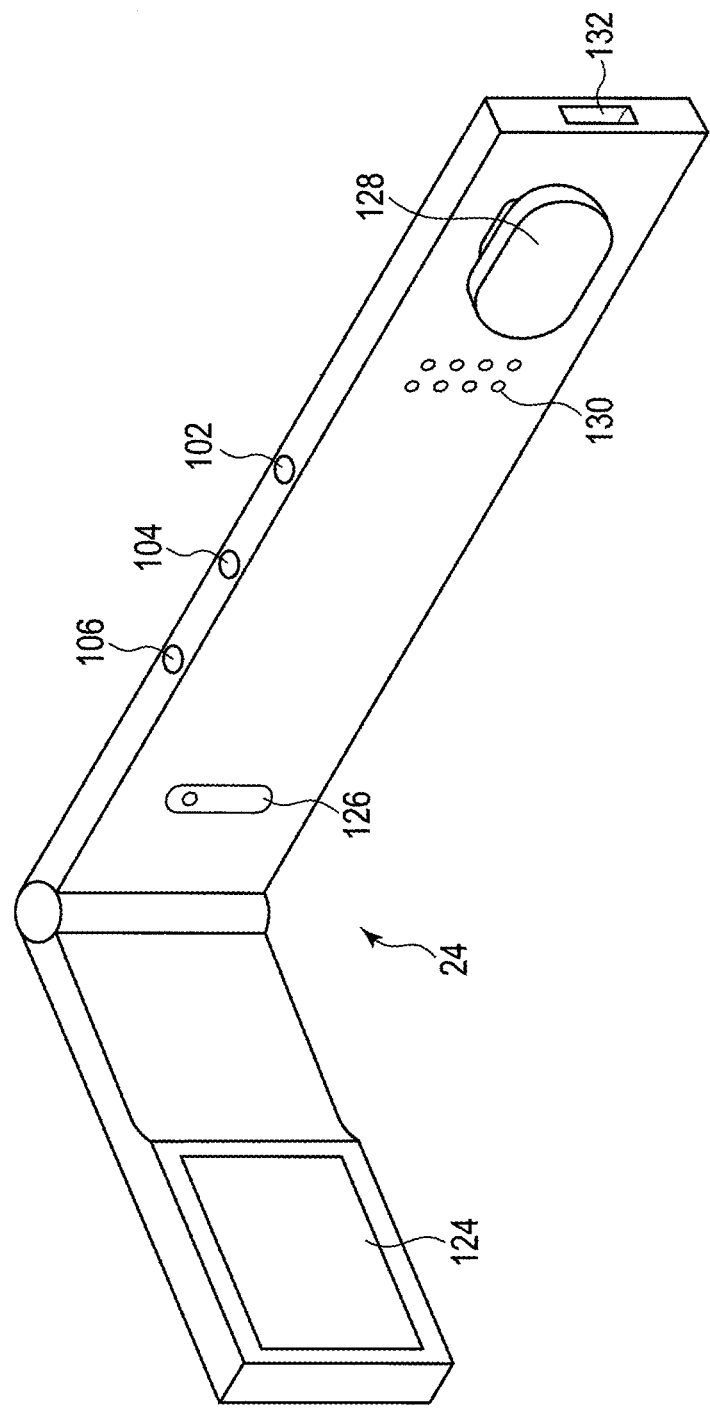
FIG. 2 is an illustration showing an example of an outer appearance of a wearable device body 24.

The wearable device body 24 is provided with a display device 124 (shown in FIG. 2). The display device 124 is viewed by one eye. Therefore, the mounting brackets 144 are provided on both the right temple and the left temple so that the wearable device body 24 can be attached to the mounting bracket on the dominant eye side. The wearable device body 24 need not be detachably attached to the eyeglass frame 142 by means of the mounting bracket 144. The wearable device for the right eye only may be prepared in which the wearable device body 24 is fixed to the right temple of the eyeglass frame 142. The wearable device for the left eye only may be prepared in which the wearable device body 24 is fixed to the left temple of the eyeglass frame 142. Furthermore, the wearable device body 24 may not be attached to the eyeglass frame 142, but may be attached to the head of the user by using a helmet or a goggle.

An engaging piece 128 (shown in FIG. 2) of the wearable device body 24 is forced between upper and lower frames of the mounting bracket 144, whereby the wearable device body 24 is attached to the eyeglass frame 142. When the wearable device body 24 is to be detached from the eyeglass frame 142, the wearable device body 24 is plucked out of the mounting bracket 144.

In a state where the wearable device body 24 is attached to the mounting bracket 144, the engaging piece 128 is somewhat movable backward and forward in the mounting bracket 144. Accordingly, the wearable device body 24 is adjustable in the front-back direction so that the user's eye can be brought to a focus on the display device 124.

Furthermore, the mounting bracket 144 is rotatable around an axis 144A perpendicular to the temple. After the wearable device body 24 is attached to the eyeglass frame 142, the wearable device body 24 is adjustable in the upward or the downward direction so that the display device 124 can be positioned on the user's line of sight. Moreover, the rotational angle of the mounting bracket 144 is about 90 degrees and, by largely rotating the mounting bracket 144 in the upward direction, the wearable device body 24 can be flipped up from the eyeglass frame 142. Thereby, even when it is difficult to watch the real thing because the field of view is obstructed by the wearable device body 24 or even when the wearable device body 24 interferes with surrounding objects in a small space, it is possible to temporarily divert/restore the wearable device body 24 from/to the field of view of the user without detaching/reattaching the entire wearable device 23 from/to the face of the user.

[Wearable Device Body 24]

The wearable device body 24 is formed of a side part to be along the temple of the eyeglass frame 142, and a front part to be positioned on the line of sight of one eye of the user. The angle which the front part forms with the side part is adjustable.

As shown in FIG. 1, on the outside surface of the front part, a camera 116, a light 118, and a camera LED 120 are provided. The light 118 is an auxiliary lighting fixture emitting light at the time of shooting a dark object. The camera LED 120 is turned on at the time of shooting a photograph or a video to thereby cause the objective person to be shot to recognize that he or she is to be shot.

On the top surface of the side part of the wearable device body 24 attached to the right side temple, first, second, and third buttons 102, 104, and 106 are provided. When the dominant eye of the user is the left eye, the wearable device body 24 is attached to the left side temple. The top and the bottom of the wearable device body 24 are reversed according to whether the wearable main body 24 is attached to the right side temple or the left side temple. Therefore, the first, second, and third buttons 102, 104, and 106 may be provided on both the top surface and the bottom surface of the side part.

On the outside surface of the side part, a touch pad 110, a fourth button 108, a microphone 112, and an illuminance sensor 114 are provided. The touch pad 110 and the fourth button 108 can be operated by a forefinger. When the wearable device body 24 is attached to the right side temple, the buttons 102, 104, and 106 are arranged such that the buttons 102, 104, and 106 can be operated by a forefinger, a middle finger, and a third finger, respectively. The touch pad 110 detects the movement of finger in up and down directions and back and forth directions on the surface on the touch pad 110 as indicated by arrows. The movement to be detected includes flicking of a finger for grazing the surface quickly in addition to dragging of a finger for moving the finger with the finger kept in contact with the surface. Upon detection of up-and-down or back-and-forth movement of the user's finger, the touch pad 110 inputs a command. In this description, the command implies an executive instruction to execute specific process to be issued to the wearable device body 24. Operation procedures for the first to fourth buttons 102, 104, 106, and 108, and the touch pad 110 are determined in advance by the application program.

For example, when the third button 106 is pushed once, item selection/item execution is carried out, when the third button 106 is pushed for a long time, a list of activated application programs is displayed, when the second button 104 is pushed once, the screen returns to the home screen, when the second button 104 is pushed for a long time, a menu of quick setting is displayed, and when the first button 102 is pushed once, cancellation (operation identical to the operation of the Esc key of the hardware keyboard) of an operation is executed.

Regarding the operation of the touch pad 110, for example, when the touch pad 110 is dragged up or down, the cursor is moved up or down, when the touch pad 110 is flicked forward (to the front of the head), the left icon is selected (continuously scrolled), when the touch pad 110 is flicked backward (to the back of the head), the right icon is selected (continuously scrolled), when the touch pad 110 is dragged forward, the left icon is selected (items are scrolled one by one), and when the touch pad 110 is dragged backward, the right icon is selected (items are scrolled one by one).

The first button 102 is arranged at such a position as to be operated by a forefinger, the second button 104 at a position by a middle finger, the third button 106 at a position by a third finger, and the fourth button 108 at a position by a little finger. The reason why the fourth button 108 is provided not on the top surface of the side part, but on the outside surface of the side part in FIG. 1 is that there is no space for the fourth button 108 on the top surface of the side part. The fourth button 108 may be provided on the top surface of the side part in the same manner as the first, the second, and the third buttons 102, 104, and 106 if the top surface has an enough space. The illuminance sensor 114 detects the illuminance of the surrounding area in order to automatically adjust the brightness of the display device 124.

FIG. 2 shows an example of an external appearance of the back side of the wearable device body 24. On the inner side of the front part, the display device 124 is provided. On the inner side of the side part, a microphone 126, a speaker 130, and the engaging piece 128 are provided. The microphone 126 is provided at a front position of the side part, and the speaker 130 and the engaging piece 128 are provided at a rear position of the side part. Headphones may be used in place of the speaker 130. In this case, the microphone 126 and the headphones may also be provided in an integrated manner as an intercom.

Figure 3:
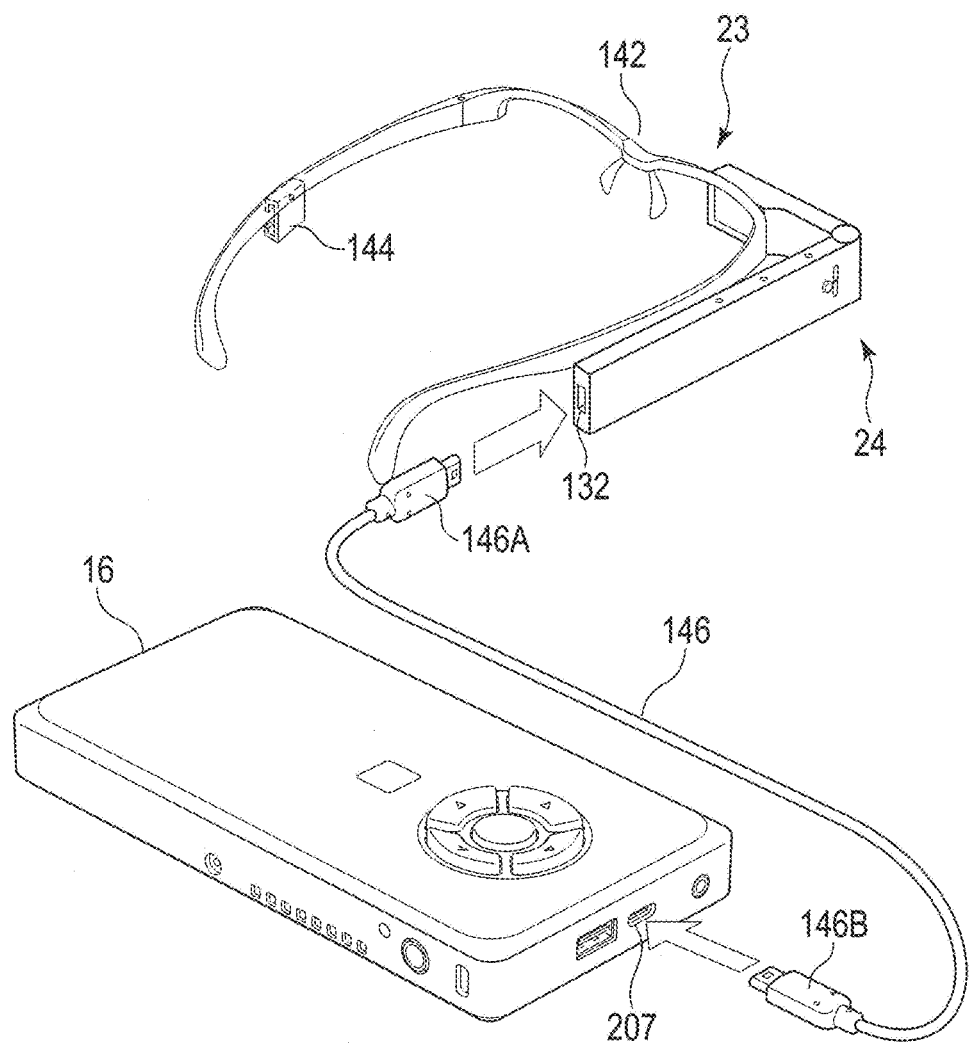
FIG. 3 is an illustration showing an example of connection between a mobile PC 16 and the wearable device body 24.

FIG. 3 shows an example of connection between the mobile PC 16 and the wearable device body 24. At a rear position of the side part, a receptacle 132 into which a plug 146A at one end of a USB type-C (registered trade mark) cable 146 conforming to the USB type-C standard is to be inserted is provided. The receptacle 132 and the plug 146A may be generally called a connector. A plug 146B at the other end of the USB type-C cable 146 is inserted into a receptacle 207 conforming to the USB type-C standard provided on an upper end face of the mobile PC 16. The receptacle 207 and the plug 146B may be generally called a connector. As described above, the wearable device body 24 is connected to the mobile PC 16 through the USB type-C cable 146, and an image signal and the USB signal are transmitted from/to the wearable device body 24 to/from the mobile PC 16 through the USB type-C cable 146. The wearable device body 24 may also be connected to the mobile PC 16 by means of wireless communication such as a wireless LAN, Bluetooth (registered trade mark), and the like.

In the embodiment, the wearable device body 24 is not provided with a battery or a DC terminal serving as a drive power supply, and the drive power is supplied from the mobile PC 16 to the wearable device body 24 through the USB type-C cable 146. However, the wearable device body 24 may also be provided with a drive power supply.

Figure 4:
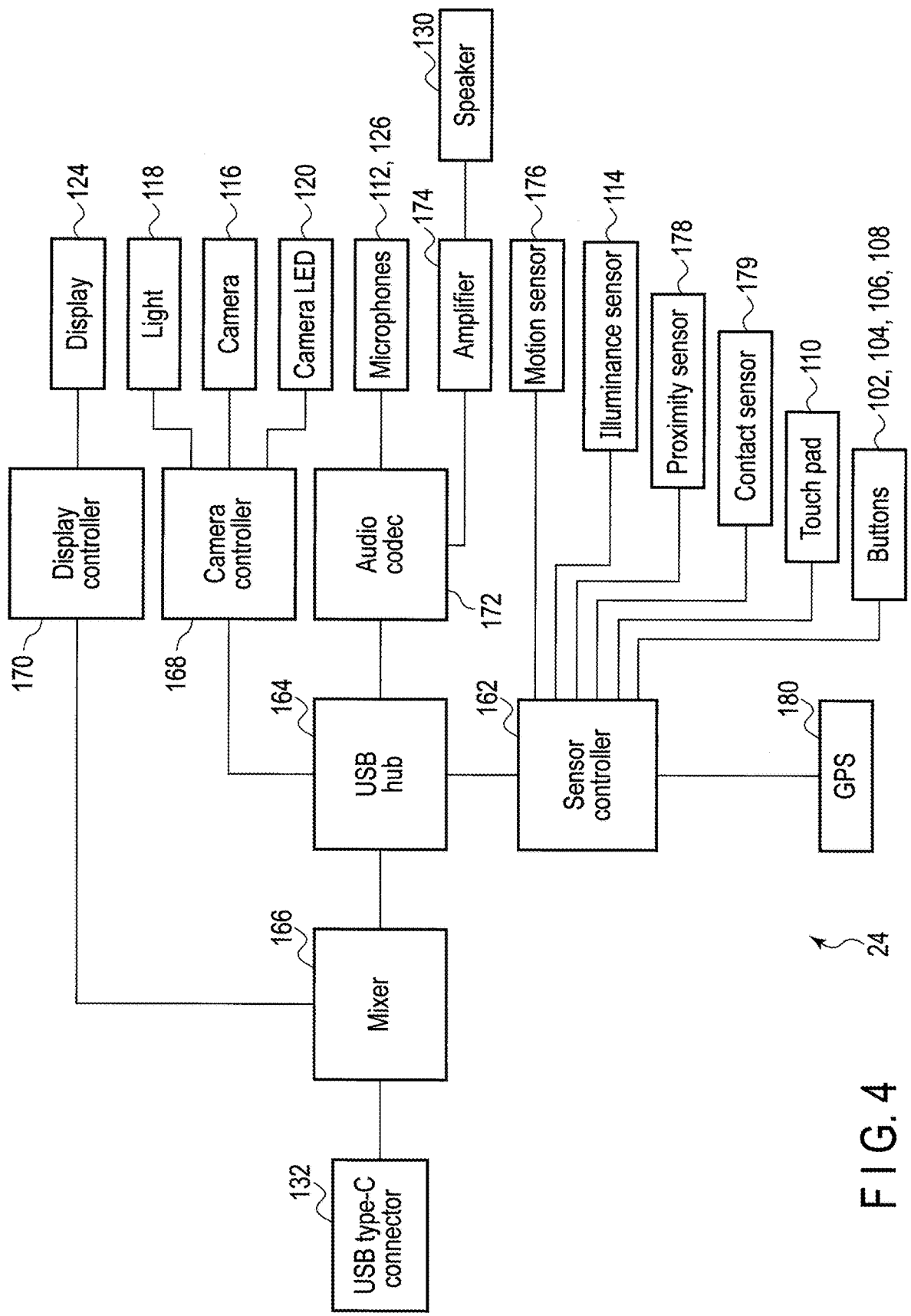
FIG. 4 is a block diagram showing an example of the wearable device body 24.

FIG. 4 is a block diagram showing an exemplary structure of the wearable device body 24. The USB type-C connector 132 is connected to a mixer 166. A display controller 170 and a USB (registered trade mark) hub 164 are respectively connected to a first terminal and a second terminal of the mixer 166. The display device 124 is connected to the display controller 170. A camera controller 168, an audio codec 172, and a sensor controller 162 are connected to the USB hub 164. The camera 116, the light 118, and the camera LED 120 are connected to the camera controller 168. Audio signals from the microphones 112 and 126 are input to the audio codec 172, and an audio signal from the audio codec 172 is input to the speaker 130 through an amplifier 174. The display device 124 is built-in the wearable device body 24 in this example. An external display device may be connected to the display controller 170 through a cable, such as an HDMI cable.

A motion sensor (for example, an acceleration sensor, a geomagnetism sensor, a gravitation sensor, a gyroscopic sensor, etc.) 176, the illuminance sensor 114, a proximity sensor 178, a contact sensor 179, the touch pad 110, the first to fourth buttons 102, 104, 106, and 108, and a GPS sensor 180 are connected to the sensor controller 162. The sensor controller 162 processes detection signals from the motion sensor 176, the illuminance sensor 114, the proximity sensor 178, the contact sensor 179, the touch pad 110, the first to fourth buttons 102, 104, 106, and 108, and the GPS sensor 180, and supplies a command to the mobile PC 16. Although not shown in FIG. 2, the motion sensor 176 and the proximity sensor 178 are arranged inside the wearable device body 24. The motion sensor 176 detects a motion, a direction, a posture and the like of the wearable device body 24. The proximity sensor 178 detects attachment of the wearable device 23 on the basis of approach of a face, a finger and the like of the user thereto. The contact sensor 179 detects physical contact of the user and may be formed of a mechanical switch or a touch pad. The contact sensor 179 detects attachment of the wearable device 23 on the basis of contact of a face, a finger and the like of the user thereto. At least one of the proximity sensor 178 and the contact sensor 179 may be omitted.

[Mobile PC 16]

Figure 5:
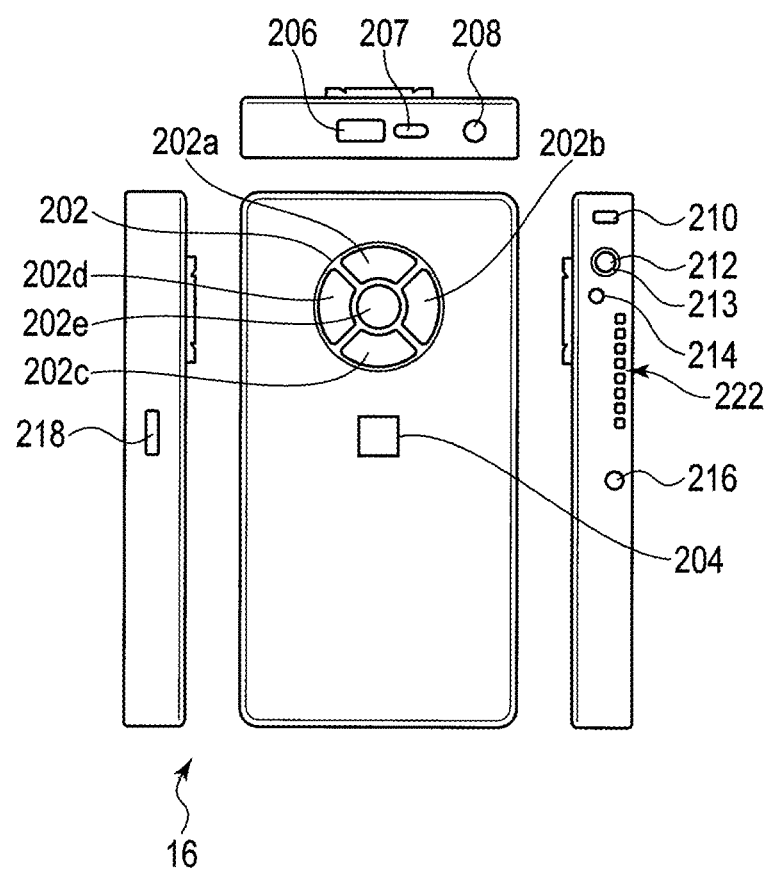
FIG. 5 is an illustration showing an example of an outer appearance of the mobile PC 16.

FIG. 5 shows an example of an external appearance of the mobile PC (mobile edge computing device) 16. The mobile PC 16 is a small-sized PC that can be carried by one hand, and has a small size and light weight, i.e., a width thereof is about 10 cm or less, a height thereof is about 18 cm or less, a thickness thereof is about 2 cm or less, and a weight thereof is about 300 gram or less. Accordingly, the mobile PC 16 can be held in a pocket of the work clothing of the user, a holster to be attached to a belt, or a shoulder case, and is wearable. Although the mobile PC 16 incorporates therein semiconductor chips such as a CPU, a semiconductor memory and the like, and storage devices such as an SSD and the like, the mobile PC 16 is not provided with a display device and a hardware input keyboard for inputting characters or numerals.

On the front surface of the mobile PC 16, five buttons 202 constituted of an up button 202a, a right button 202b, a down button 202c, a left button 202d, and a center button 202e (also called a decision button or an enter button) are arranged.

At default setting, a key code indicative of an up directional input is assigned to the up button 202a. The up directional input causes a cursor to move in an up direction. Similarly, a key code indicative of a right directional input is assigned to the right button 202b, a key code indicative of a down directional input is assigned to the down button 202c, and a key code indicative of a left directional input is assigned to the left button 202d, at default setting.

The up button 202a, the right button 202b, the down button 202c, and the left button 202d (i.e., with the exception of the center button 202e, the five buttons 202) are called cursor buttons.

The cursor buttons are arranged at equal intervals on a circle around the center button 202e. The up button 202a and the down button 202c are arranged on the opposite sides of the center button 202e and the right button 202b and the left button 202d are arranged on the opposite sides of the center button 202e.

A fingerprint sensor 204 is arranged below the five buttons 202. The mobile PC 16 is not provided with a hardware input keyboard for inputting characters or numerals. Thus, a password (also called a PIN) cannot be input. Therefore, the fingerprint sensor 204 is used for user authentication at the time of sign-in of the mobile PC 16. The five buttons 202 can input a command.

User authentication at the time of sign-in may be carried out by assigning numeric values or alphabets to the buttons 202a to 202d of the five buttons 202, and by inputting a password using the five buttons 202. In this case, the fingerprint sensor 204 can be omitted. Numeric values or alphabets are assigned to the four buttons 202a to 202d other than the center button 202e, and the assignable number of the numeric values or alphabets is only four. Thus, there is a possibility of numeric values or alphabets input in a random manner being coincident with the password. However, by making the digit number of the password large, it is possible to make the probability that the numeric values or alphabets input in a random manner will be coincident with the password low. Authentication by the five buttons 202 may be enabled in also the mobile PC 16 provided with the fingerprint sensor 204. If one mobile PC 16 may be shared among a plurality of users, it is not possible to cope with such a case by only the fingerprint authentication.

The operations identical to those of the buttons 102, 104, 106, and 108, and the touch pad 110 of the wearable device body 24 can also be applied to the five buttons 202. The user cannot watch the state where the buttons 102, 104, 106, and 108, and the touch pad 110 of the wearable device body 24 are being operated. Therefore, it may be necessary for a user to become accustomed to carrying out an intended operation depending on the user. Further, the buttons 102, 104, 106, and 108 and the touch pad 110 are small in size, and thus they may be difficult to operate. In the embodiment, the five buttons 202 of the mobile PC 16 can also be operated in the manner same as the buttons 102, 104, 106, and 108 and the touch pad 110, and hence the above-mentioned difficulty may be overcome. The operation procedures of the five buttons 202 are determined by the application program.

For example, when the center button 202e is pushed once, item selection/item execution is carried out (corresponding to pushing once of the third button 106 in the wearable device body 24), when the center button 202e is pushed for a long time, ending or cancellation of an operation is carried out (corresponding to pushing once of the first button 102 in the wearable device body 24), when the up button 202a is pushed once, the cursor is moved upward (corresponding to upward drag on the touch pad 110 in the wearable device body 24), when the up button 202a is pushed for a long time, a list of activated application programs is displayed (corresponding to pushing the third button 106 for a long time in the wearable device body 24), when the down button 202c is pushed once, the cursor is moved downward (corresponding to downward drag on the touch pad 110 in the wearable device body 24), when the down button 202c is pushed for a long time, a menu of quick setting (described later) is displayed (corresponding to pushing of the second button 104 for a long time in the wearable device body 24), when the left button 202d is pushed once, the right icon is selected (corresponding to backward drag/flick on the touch pad 110 in the wearable device body 24), and when the right button 202b is pushed once, the left icon is selected (corresponding to forward drag/flick on the touch pad 110 in the wearable device body 24).

On the upper side face of the mobile PC 16, a USB 3.0 connector 206, the USB type-C connector 207, and an audio jack 208 are provided.

On one side face (side face on the left side when viewed from the front) of the mobile PC 16, a memory card slot 218 for a memory card is provided. The memory card includes, for example, an SD card (registered trade mark), a micro SD card (registered trade mark), and the like.

On the other side face (side face on the right side when viewed from the front) of the mobile PC 16, a slot 210 for Kensington Lock (registered trade mark), a power switch 212, a power LED 213, a DC IN/battery LED 214, a DC terminal 216, and ventilation holes 222 for cooling are provided. The power LED 213 is arranged around the power switch 212, and turned on during the period of power-on. The DC IN/battery LED 214 indicates the state of the mobile PC 16 such as whether or not a battery 352 is being charged, and the remaining battery level. Although the mobile PC 16 can be driven by the battery 352, the mobile PC 16 can also be driven in the state where the AC adaptor (not shown) is connected to the DC terminal 216. Although not shown, the back side of the mobile PC 16 is configured such that the battery 352 can be replaced with a new one by a one-touch operation.

Figure 6:
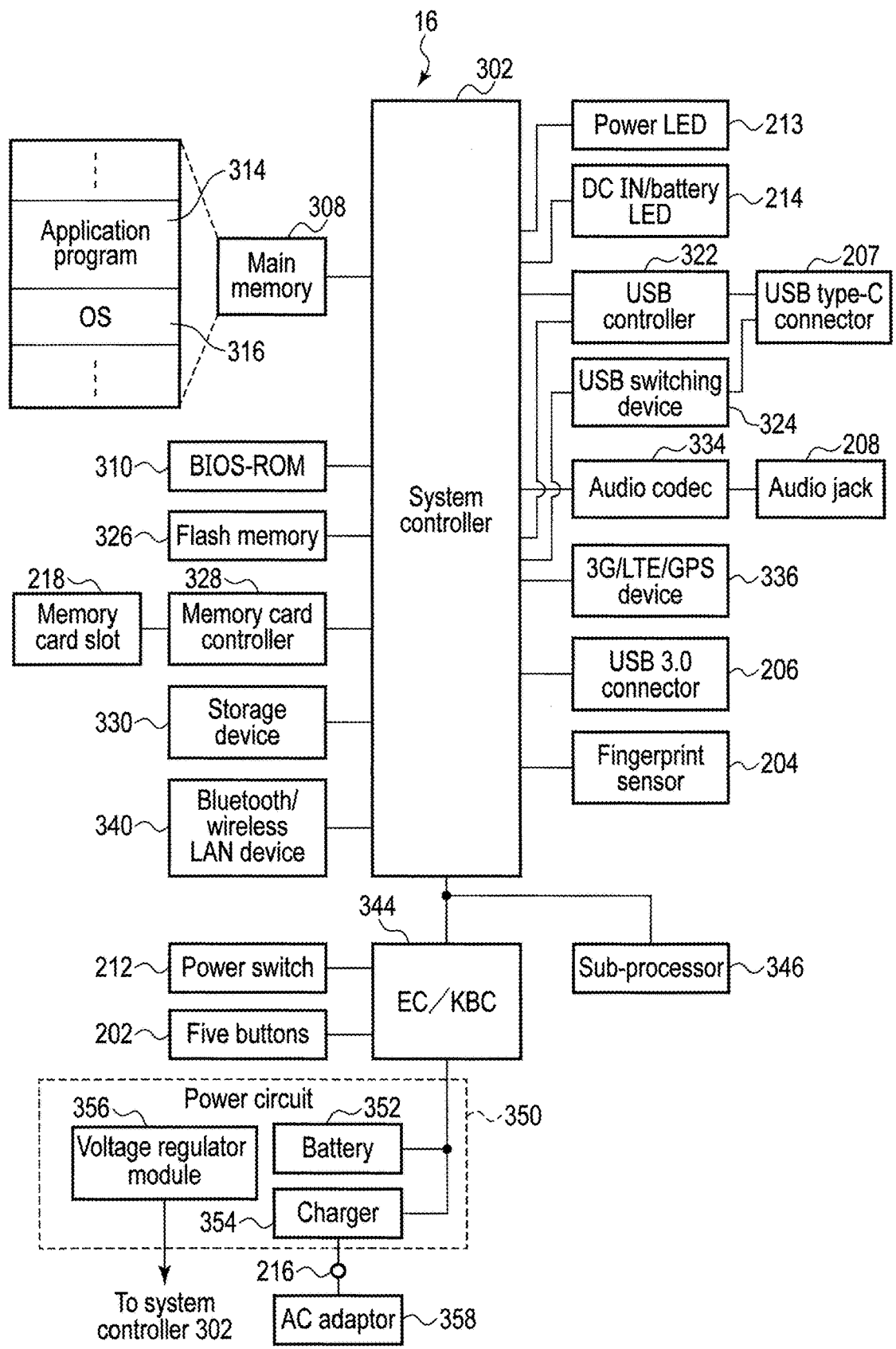
FIG. 6 is a block diagram showing an example of the mobile PC 16.

FIG. 6 is a block diagram showing an exemplary structure of the mobile PC 16. The mobile PC 16 can carry out video distribution of an image shot by the wearable device body 24 to the operator terminal, and enables browse of the image received from the operator terminal. For this reason, the mobile PC 16 is provided with a camera function and a viewer function. The camera function is a function of shooting a photograph or a video by means of the camera 116 of the wearable device body 24. The shot photograph and video are stored in a camera folder (not shown) in the mobile PC 16, and can be browsed by the viewer function. The viewer function is a function of enabling browse of a file stored in the camera folder. The types of the files include still images, moving images, PDF files, photographs and videos shot by the camera function, images received from the operator terminal, images transmitted to the operator terminal, and files stored in a user folder (not shown) in the mobile PC 16.

The mobile PC 16 is provided with a system controller 302. The system controller 302 is formed of a hardware processor (CPU) and a controller/hub (not shown in FIG. 6). A main memory 308, a BIOS-ROM 310, the power LED 213, the DC IN/battery LED 214, and a USB controller 322 are connected to the hardware processor of the system controller 302. A flash memory 326, a memory card controller 328, a storage device 330 such as an HDD or an SSD, a USB switching device 324, an audio codec 334, a 3G/LTE/GPS device 336, the fingerprint sensor 204, the USB 3.0 connector 206, a Bluetooth/wireless LAN device 340, and an embedded controller/keyboard controller (EC/KBC) 344 are connected to the controller/hub of the system controller 302.

The system controller 302 executes various programs to be loaded from the storage device 330 into the main memory 308. These programs include an OS 316, an application program 314, and the like. The system controller 302 also executes the Basic Input/Output System (BIOS) stored in the BIOS-ROM 310 which is a nonvolatile memory. The BIOS is a system program for hardware control.

When the user executes a predetermined operation for the mobile PC 16 or the wearable device body 24, a setting tool (program) by a graphic user interface (GUI) included in the application program 314 is activated. The user can change setting values of the mobile PC 16 or the wearable device body 24 by operating the mobile PC 16 or the wearable device body 24 in accordance with instructions of the setting tool.

The setting values of the mobile PC 16 and the wearable device body 24 are recorded in a setting file F (described later). The setting file F is stored in the flash memory 326 or the storage device 330.

The system controller 302 reads the setting file F at a certain timing, for example, at the time of starting of the mobile PC 16 and executes setting operations for the mobile PC 16 and the wearable device body 24 in accordance with the setting values and setting items.

The audio codec 334 converts a digital audio signal which is an object to be reproduced into an analog audio signal, and supplies the converted analog audio signal to the audio jack 208. Further, the audio codec 334 converts an analog audio signal input from the audio jack 208 into a digital signal.

The memory card controller 328 accesses to a memory card such as an SD card to be inserted into the memory card slot 218, and controls read/write of data from/to the SD card.

The USB controller 322 carries out control of transmission/reception of data to/from the USB type-C cable 146 (shown in FIG. 3) connected to the USB type-C connector 207 or the USB 3.0 cable (not shown) connected to the USB 3.0 connector 206.

Although not shown, a port extension adaptor including ports or connectors according to several interfaces can be connected also to the USB type-C connector 207, and an interface which is not provided in the mobile PC 16, such as the HDMI, RGB, wired LAN, and the like, can be used.

The Bluetooth/wireless LAN device 340 executes wireless communication conforming to the Bluetooth/IEEE 802.11 standard for the purpose of connection to the network 22. The connection to the network 22 may not depend on wireless communication, and may depend on wired LAN communication conforming to the IEEE 802.3 standard.

The fingerprint sensor 204 is used for fingerprint authentication at the time of startup of the mobile PC 16.

A sub-processor 346, the power switch 212, and the five buttons 202 are connected to the EC/KBC 344. The EC/KBC 344 has a function of turning on or turning off the power to the mobile PC 16 according to the operation of the power switch 212. The control of power-on and power-off is executed by cooperative operation of the EC/KBC 344 and the power circuit 350. Even during a power-off period of the mobile PC 16, the EC/KBC 344 operates by the power from a battery 352 or an AC adaptor 358 (connected as an external power supply). The power circuit 350 uses the power from the battery 352 or the AC adaptor 358 to thereby generate power to be supplied to each component. The power circuit 350 includes a voltage regulator module 356. The voltage regulator module 356 is connected to the hardware processor in the system controller 302.

Although the mobile PC 16 is constituted as a body separate from the wearable device body 24, the mobile PC 16 may be incorporated into the wearable device body 24, and both of them may also be integrated into one body.

[Application Program for Cursor Button Direction Setting]

Conventionally, a default key code has been assigned for the cursor buttons of the mobile PC 16 (the up button 202a, the right button 202b, the down button 202c, and the left button 202d), and the cursor button orientation could not be changed. Also, even in a case where the GUI of the application program for the mobile PC 16 is to be displayed on the display device 124 of the wearable device body 24, and the user is to change the key code, the resolution of the display 124 is low, and the GUI needs to be operated by using the small touchpad 110. Therefore, operability is not good for the user. For this reason, a manager of the mobile PC 16, for example, used to execute the change of the key code by connecting an external display, a keyboard, and a mouse to the mobile PC 16.

In the following, an application program by which the user can easily change the orientation of the cursor buttons of the mobile PC 16, by using the mobile PC 16 and the wearable device 23, will be explained.

As described above, the wearable device body 24 and the mobile PC 16 are electronic devices capable of processing various kinds of information.

Figure 7:
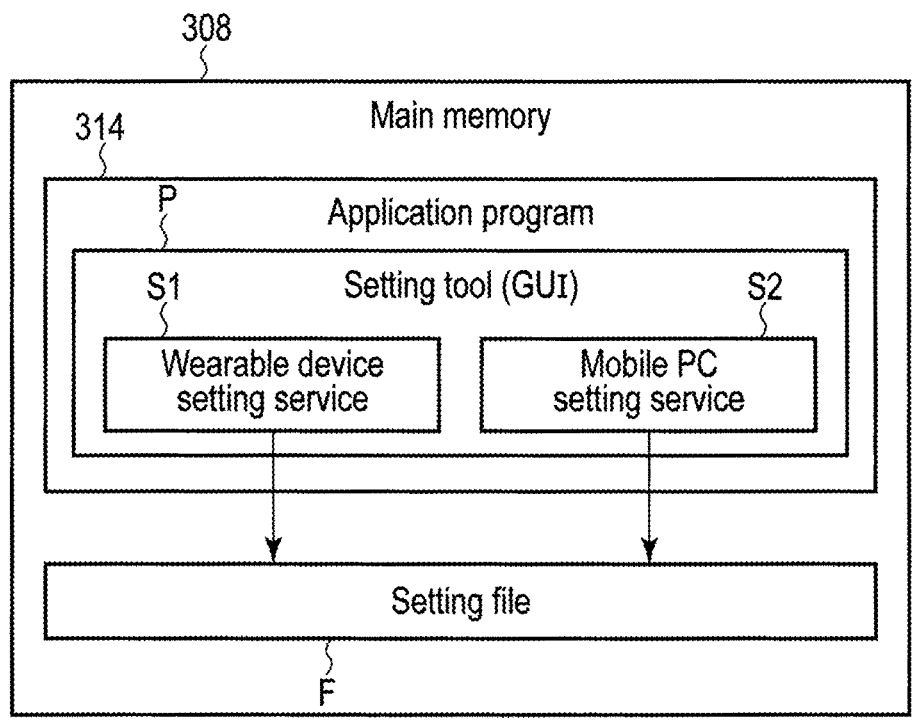
FIG. 7 is an illustration showing an example of access to a setting file F.

FIG. 7 is an illustration showing an example of access to the setting file F.

As described above, the application program 314 includes a setting tool P by the GUI. For example, when the user operates the wearable device 23 and starts the setting tool P, a setting screen is displayed on the display device 124 of the wearable device body 24.

The user can make various settings regarding the wearable device body 24 and the mobile PC 16 on this setting screen. Details of items which can be set on the setting screen will be described later with reference to FIGS. 8 and 9.

The setting items and setting values regarding the wearable device body 24 are recorded into the setting file F through a wearable device setting service S1 included in the setting tool P. Similarly, the setting items and setting values regarding the mobile PC 16 are recorded into the setting file F through a mobile PC setting service S2 included in the setting tool P.

When the setting file F is updated, by reloading the setting file F, the mobile PC 16 reflects the setting values of the updated setting item into the mobile PC 16 and/or the wearable device body 24.

Note that the setting screen of the setting tool P may be displayed on an external display (not shown) or the like that is connected to the mobile PC 16 by, for example, a manager of the mobile PC 16. Generally, since the resolution of the external display and the resolution of the display device 124 of the wearable device body 24 are different from each other greatly, the GUI of the setting screen displayed on the external display may be different from the GUI of the setting screen displayed on the display device 124. More specifically, when the setting screen is to be displayed on the external display, the GUI may be one which can be easily operated by an input device such as a mouse and a keyboard. Further, when the setting screen is to be displayed on the display device 124, the GUI may be one which can be easily operated by the touchpad 110, the five buttons 202, and the like.

In the following, while a setting screen displayed on the wearable device body 24 will be explained, setting items and a setting method of the setting screen to be explained may also be applied to a case where the setting screen is displayed on the external display connected to the mobile PC 16.

Figure 8:
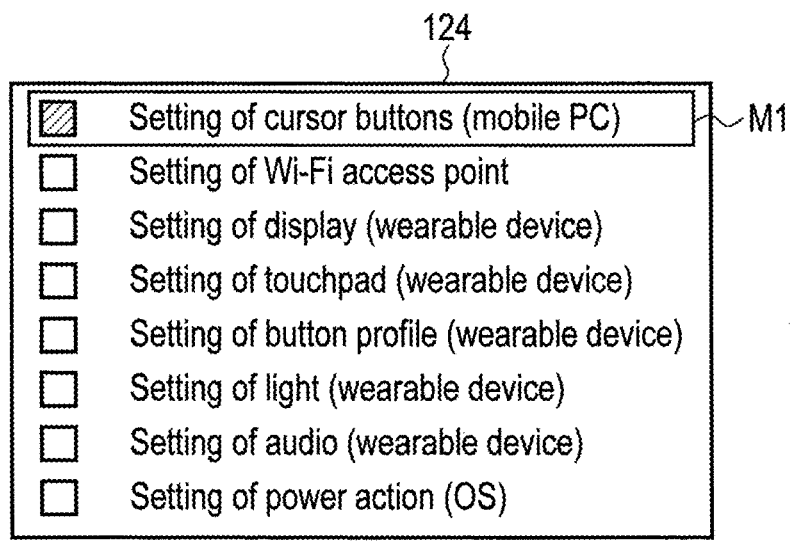
FIG. 8 is an illustration showing a first example of a setting menu screen according to a first embodiment.
Figure 9:
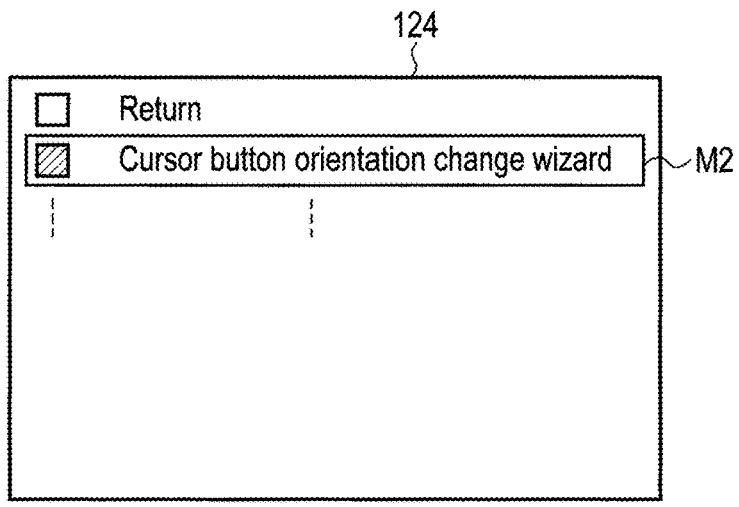
FIG. 9 is an illustration showing a second example of the setting menu screen according to the first embodiment.

FIGS. 8 and 9 are illustrations each showing an example of a setting menu.

When the user starts the setting tool P by performing a predetermined operation, a setting menu screen is displayed on the display device 124 of the wearable device body 24. As shown in FIG. 8, for example, setting items that can be changed in the mobile PC 16 and the wearable device 23 by the user are displayed on the setting menu screen.

Items that can be set by the user are, for example, the setting of the cursor buttons of the mobile PC 16, the setting of a Wi-Fi access point, the settings of the display device 124 (screen), the touchpad 110, a button profile of the buttons 102, 104, 106, and 108, the light 118, and audio of the wearable device body 24, and the setting of power action of the OS 316 of the mobile PC 16.

The user selects one of the setting items of the above by operating the touchpad 110 and/or the up button 202*a* or the down button 202*c* of the five buttons 202. When the third button 106 or the center button 202*e* is pushed by the user, the setting tool P displays a submenu of the selected setting item.

Among the above setting items shown in FIG. 8, a submenu of item M1 (setting of the orientation of the cursor buttons of the mobile PC 16) is shown in FIG. 9.

In the submenu, item M2 for starting a cursor button orientation change wizard to allow the user to assign directions to the cursor buttons is displayed. Note that the submenu may display items other than the item M2.

After the submenu shown in FIG. 9 is displayed, the user operates, for example, the touchpad 110 and/or the up button 202*a* or the down button 202*c* of the five buttons 202, and pushes the third button 106 or the center button 202*e* while the item M2 is selected. In this way, the cursor button orientation change wizard is started.

In the following, by referring to FIGS. 10 to 14, details of the cursor button orientation changing process using the cursor button orientation change wizard will be described.

Figure 10:
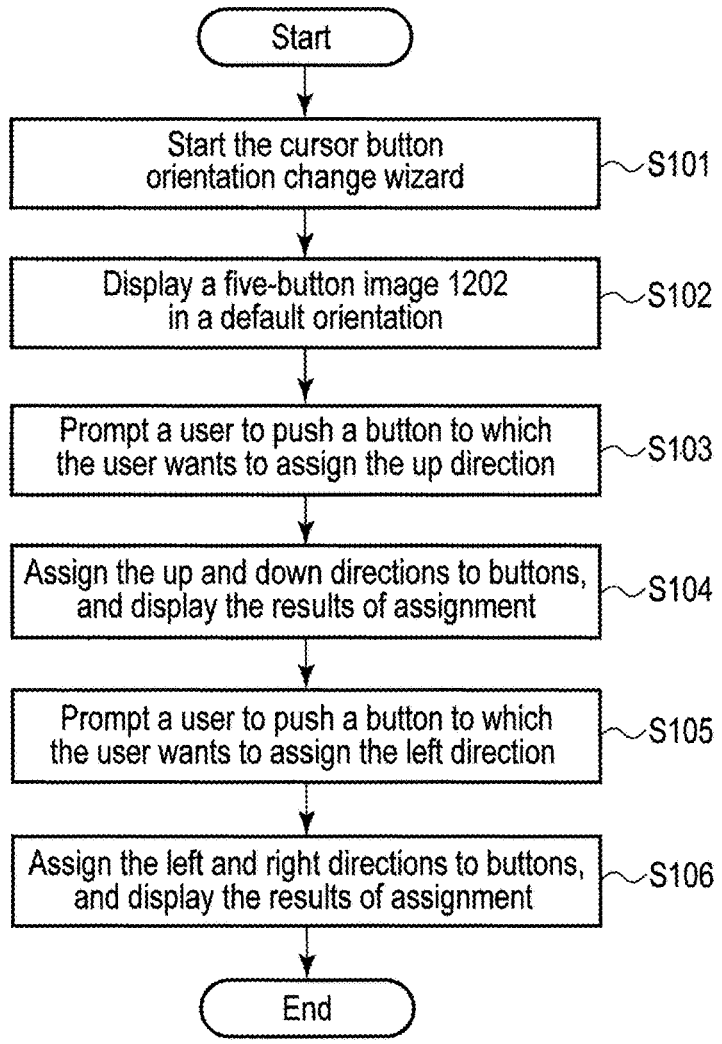
FIG. 10 is a flowchart showing an example of a cursor button orientation changing process according to the first embodiment.

FIG. 10 is a flowchart showing an example of the cursor button orientation changing process executed by the setting tool P according to the first embodiment. FIGS. 11 to 14 show examples of a GUI of a cursor button orientation changing screen corresponding to some of process steps shown in FIG. 10.

In step S101, the setting tool P starts the cursor button orientation change wizard by the user's operation described above with reference to FIGS. 8 and 9. On the display device 124 of the wearable device body 24, a cursor button orientation changing screen is displayed.

In step S102, the setting tool P displays on the display device 124, an image (hereinafter called a five-button image) 1202 of the five buttons 202 of the mobile PC 16 in an image area D1, as shown in FIG. 11. The five-button image 1202 includes an up button image 1202*a*, a right button image 1202*b*, a down button image 1202*c*, a left button image 1202*d*, and a center button image 1202*e*.

The five-button image 1202 is displayed in a default direction.

Displaying the five-button image 1202 in the default direction means that the five-button image 1202 is displayed such that the up button image 1202*a* comes to the top, for example.

Note that the setting tool P may determine the default direction with reference to the position of the fingerprint sensor 204. For example, the setting tool P may set the default direction of the five-button image 1202 such that the fingerprint sensor 204 is positioned under the five buttons 202.

In step S103, the setting tool P prompts a user to push one of the cursor buttons 202*a* to 202*d* to which the user wants to assign the up direction.

FIG. 11 shows the GUI of the cursor button orientation changing screen displayed in step S103.

The GUI shown in FIG. 11 includes an image area D1 displaying the five-button image 1202 and a text area T1 displaying a message for prompting the user to push one of the cursor buttons 202*a* to 202*d* to which the user wants to assign the up direction.

The user pushes one of the cursor buttons (the up button 202*a*, the right button 202*b*, the down button 202*c*, and the left button 202*d*) to which the user wants to assign the up direction.

In step S104, the setting tool P assigns the up and down directions to buttons, and displays the results of assignment. More specifically, the setting tool P assigns the up direction to the cursor button pushed by the user and the down direction to a cursor button located on a side opposite to (facing) the pressed cursor button.

FIG. 12 shows the GUI of the cursor button orientation changing screen displayed in step S104.

The GUI shown in FIG. 12 includes the image area D1, a text area T2 displaying a message informing that the up and down directions have been assigned, a text area T3, and a text area T4.

The text area T3 displays a character string indicating that the up direction is assigned to a near button. For example, when it is determined that the up direction is assigned to the left button 202*d*, the text area T3 is placed near the left button image 1202*d*.

Similarly, a text area T4 displays a character string indicating that the down direction is assigned to the button. It is determined that the down direction is assigned to the right button 202*b* at a position facing the new up button (left button 202*d*). Accordingly, the text area T4 is placed near the right button image 1202*b*.

Note that the text areas T3 and T4 may display character strings other than the character strings illustrated in FIG. 12, or a number, a symbol, or the like. Also, the text areas T3 and T4 may be placed inside the image area D1 or within the button images.

If the user pushes the center button 202*e*, the process goes to step S105.

In step S105, the setting tool P prompts a user to push a button to which the user wants to assign the left direction.

FIG. 13 shows the GUI of the cursor button orientation changing screen displayed in step S105.

The GUI shown in FIG. 13 includes the image area D1, the text areas T3 and T4, and a text area T5 displaying a message for prompting the user to push a button to which the user wants to assign the left direction.

The user pushes one of the cursor buttons which is other than the new up button and the new down button which are assigned in the above-described process and to which the user wants to assign the left direction.

In step S106, the setting tool P assigns the left and right directions to buttons, and displays the results of assignment. More specifically, the setting tool P assigns the left direction to the cursor button pushed by the user, and the right direction to a cursor button located on a side opposite to (facing) the pressed cursor button.

FIG. 14 shows the GUI of the cursor button orientation changing screen displayed in step S106.

The GUI shown in FIG. 14 includes the image area D1, the text areas T3 and T4, text areas T6, T7, and T8. The text area T8 displays a message informing that four directions have been assigned and prompting the user to push the center button to finish the cursor button orientation change wizard.

The text area T6 displays a character string indicating that the left direction is assigned to the button. For example, when it is determined that the left direction is assigned to the up button 202a, the text area T6 is placed near the up button image 1202a.

Similarly, the text area T7 displays a character string indicating that the right direction is assigned to the button. It is determined that the right direction is assigned to the down button 202c at a position facing the new left button (up button 202a). Accordingly, the text area T7 is placed near the down button image 1202c.

If the user pushes the center button 202e, the setting tool P finishes the cursor button orientation change wizard. The setting tool P also records the results of assignment of the cursor buttons through the wearable device setting service S1, into the setting file F.

The GUIs of the cursor button orientation changing screen shown in FIGS. 11, 12, 13, and 14 may include a message indicating that the cursor button orientation change wizard is cancelled by a long-pressing of the center button 202e.

According to the first embodiment, the setting tool P displays a setting menu which can be operated by the touchpad 110 and/or the five buttons 202 on the display device 124 of the wearable device body 24. Thus, the user can operate the setting menu easily and start the cursor button orientation change wizard even in a state where the user wears the wearable device 23. Accordingly, the convenience of the user is improved.

Further, in the first embodiment, by having the user push the cursor buttons to change a cursor button orientation in a predetermined order through the cursor button orientation change wizard, the setting tool P ends the change of the cursor button orientation. Accordingly, in whichever direction the mobile PC 16 is mounted on the body of the user, the user himself/herself can change the cursor button orientation by operating the five buttons 202 after mounting the mobile PC 16 to the user. Thus, the convenience of the user is improved. Further, since the user changes the cursor button orientation by pushing the buttons 202 used in an actual work environment, a setting error can be reduced.

Further, by the cursor button orientation change wizard, when the four directions are to be assigned, the setting tool P assigns the down direction to a cursor button located on a side opposite to (facing) the new up button, and the right direction to a cursor button located on a side opposite to (facing) the new left button. In this way, as the user selects, for example, only the two buttons to which the user wants to assign the up and left directions, in other words, the two buttons corresponding to the two directions, the four directions are assigned to the four buttons. Accordingly, the time required for the user to perform the above setting can be reduced.

In the first embodiment, it has been explained that the four directions correspond to the up, down, left, and right directions, for example. However, even in a case where four directions other than the above (in other words, arbitrary four directions different from each other) are assigned, the above-described setting process can be applied.

Note that in the first embodiment, a setting process for a case where four directions are assigned to the four cursor buttons arranged circumferentially at regular intervals has been explained. However, in circumstances where multiple directions are to be assigned to multiple cursor buttons not arranged circumferentially or not arranged at regular intervals, the above-described setting process can be applied.

For example, in the case of assigning two directions to two facing cursor buttons, by merely determining a cursor button corresponding to one direction by a procedure similar to that shown in FIG. 10, assignment of the two cursor buttons is determined. In this case, even if the above two cursor buttons are not arranged facing each other, the cursor buttons can be set by a similar procedure.

Further, in the case of assigning eight directions to eight cursor buttons arranged circumferentially at regular intervals, respectively, by merely determining cursors buttons covering the four directions by a procedure similar to that shown in FIG. 10, assignment of all of the cursor buttons covering the eight directions is determined.

Note that in the first embodiment, it has been explained that a GUI of the cursor button orientation change wizard is displayed on the display device 124. However, the cursor button orientation change wizard may be executed only by audio guidance by outputting voice data representing the messages in the text areas T1, T2, T5, TB, and the like, through the speaker 130 of the wearable device body 24, for example.

Second Embodiment

A modification of the cursor button orientation changing process using a cursor button orientation change wizard will be explained. Since the structures of the mobile PC 16 and the wearable device body 24 are the same as those described in the first embodiment, explanation of these structures is omitted.

Figure 15:
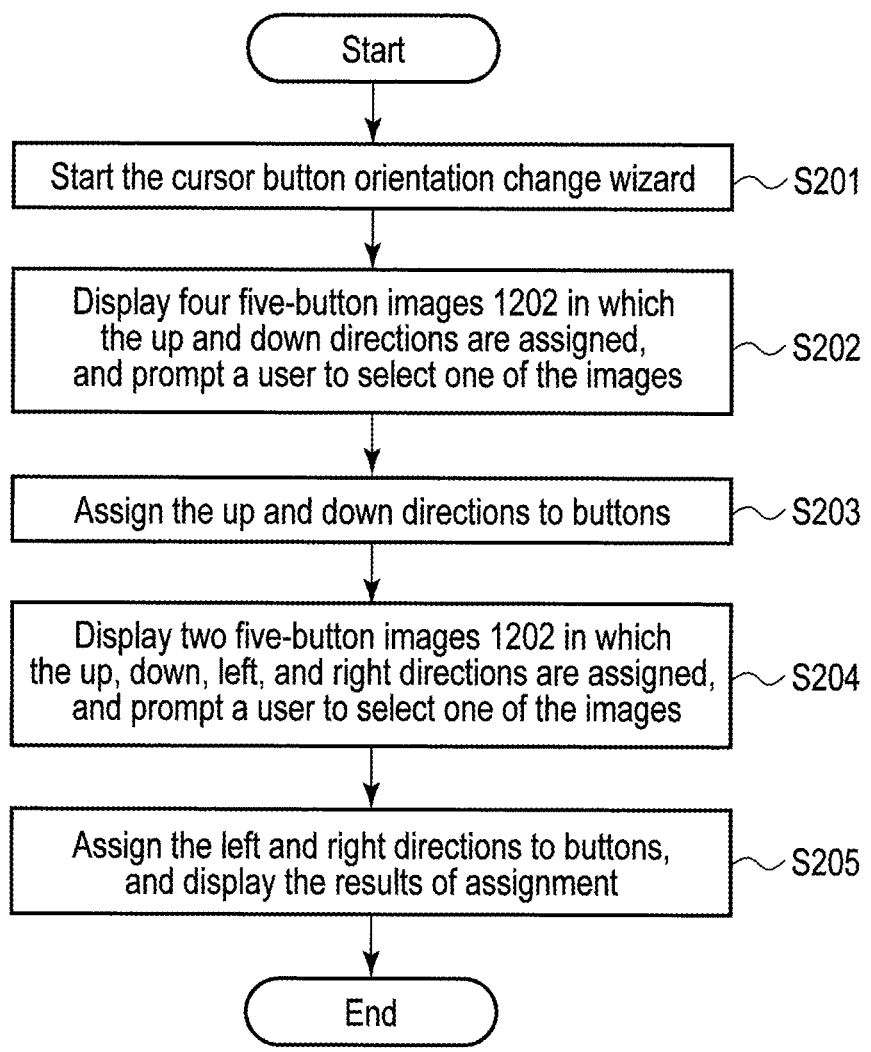
FIG. 15 is a flowchart showing an example of the cursor button orientation changing process according to a second embodiment.

FIG. 15 is a flowchart showing an example of a cursor button orientation changing process in the second embodiment. Further, FIGS. 16 and 17 show examples of a GUI of the cursor button orientation changing screen corresponding to some of process steps shown in FIG. 15.

Since step S201 is similar to step S101 of FIG. 10, explanation of step S201 is omitted.

Figure 16:
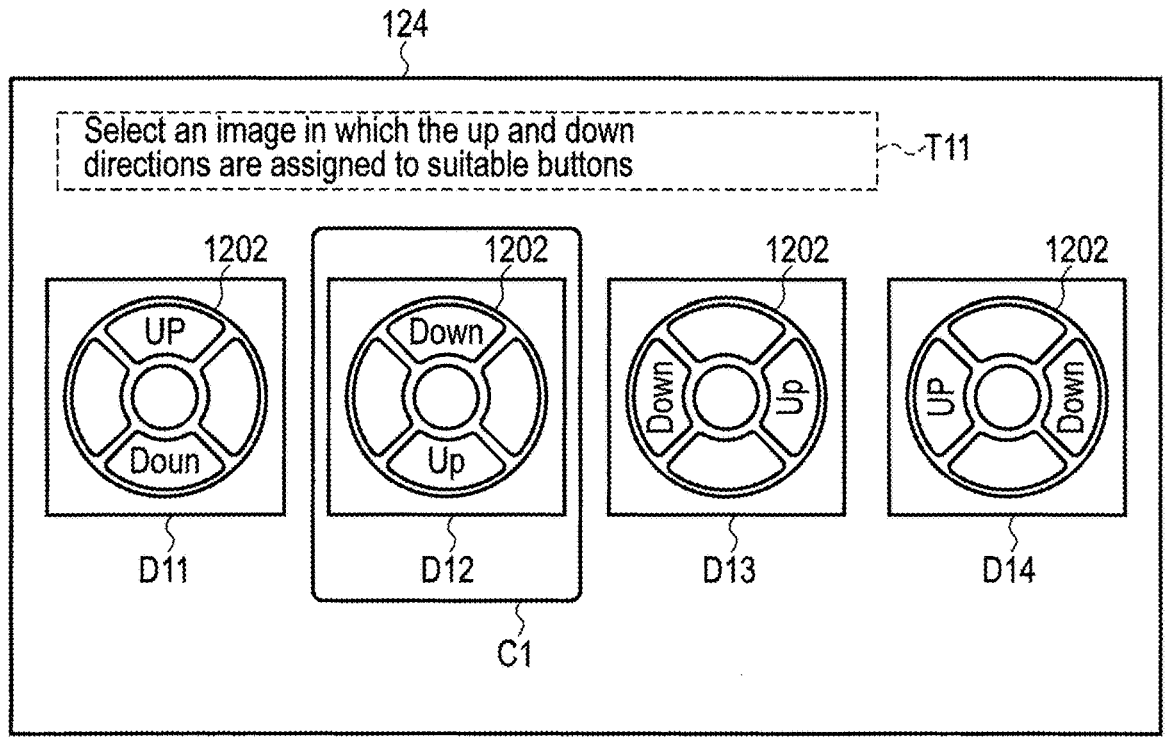
FIG. 16 is an illustration showing a first example of the cursor button orientation changing screen according to the second embodiment.
Figure 17:
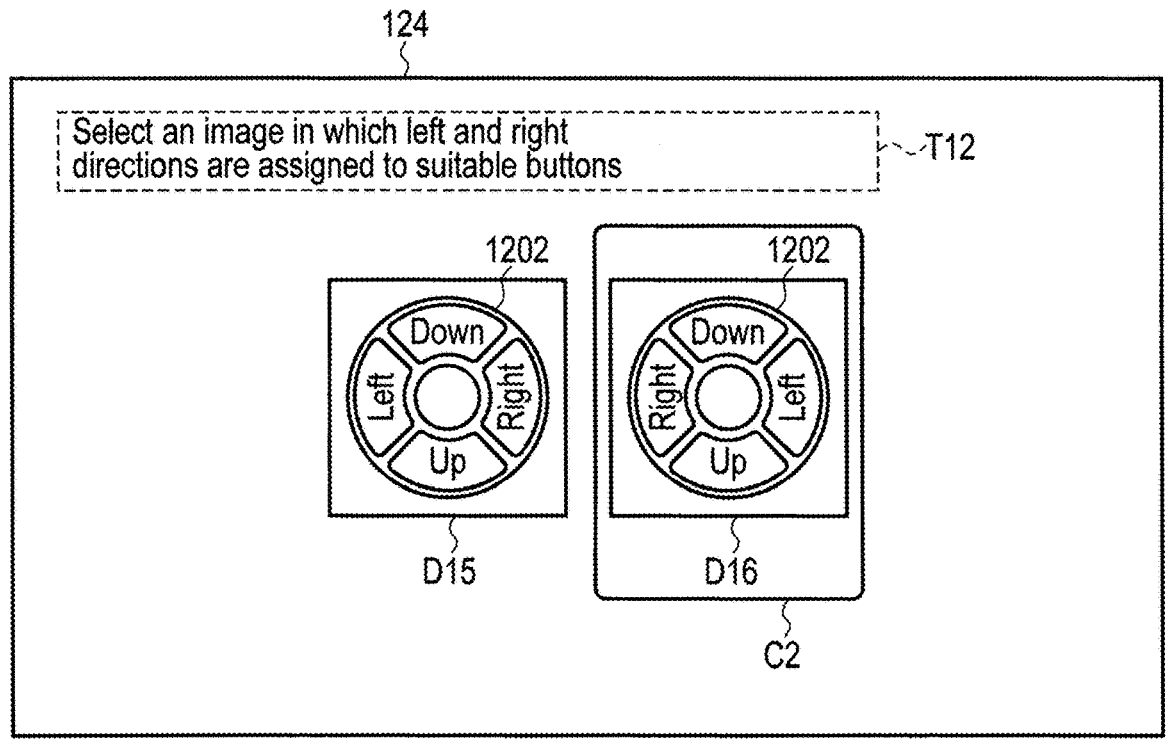
FIG. 17 is an illustration showing a second example of the cursor button orientation changing screen according to the second embodiment.

In step S202, the setting tool P displays on the display device 124, four five-button images 1202 in image areas D11, D12, D13, and D14 as shown in FIG. 16. The five-button images 1202 indicate that the up and down directions are assigned to four combinations of two cursor buttons. In step S202, the setting tool P also prompts a user to select one of the five-button images 1202 in the four image areas D11, D12, D13, and D14 in which the up and down directions are assigned to two suitable cursor buttons. As in step S102, each of the five-button images 1202 is displayed in the default direction in step S202.

The user selects one of the five-button images 1202 in the four image areas D11, D12, D13, and D14, in which the up and down directions are assigned to two suitable cursor buttons, by operating the cursor buttons 202b and 202d to move a cursor C1 on the display device 124. When the center button 202e is pushed, the process goes to step S203.

FIG. 16 shows the GUI of the cursor button orientation changing screen displayed in step S202.

The GUI shown in FIG. 16 includes the image areas D11, D12, D13 and D14, and a text area T11 displaying a message for prompting the user to select one of the five-button images 1202 in the image areas D11, D12, D13, and D14 in which the up and down directions are assigned to two suitable cursor buttons.

In step S203, the setting tool P assigns the up and down directions to the two cursor buttons as indicated by the five-button image 1202 in the image area D11, D12, D13, or D14 selected by the user. In FIG. 16, if the user pushed the center button 202e when the cursor C1 is at the image area D12, the setting tool P assigns the up direction to the cursor button (down button) 202c and the down direction to the cursor button (up button) 202a.

In step S204, the setting tool P displays on the display device 124, two five-button images 1202 in image areas D15 and D16 as shown in FIG. 17. The five-button images 1202 indicate that the up, down, left, and right directions are assigned to two combinations of four cursor buttons. In step S204, the setting tool P also prompts a user to select one of the five-button images 1202 in the two image areas D15 and D16 in which the up, down, left, and right directions are assigned to four suitable cursor buttons. As in step S102, each of the five-button images 1202 is displayed in the default direction in step S204.

The user selects one of the five-button images 1202 in the two image areas D15 and D16, in which the up, down, left, and right directions are assigned to four suitable cursor buttons, by operating the cursor buttons 202b and 202d to move a cursor C2 on the display device 124. When the center button 202e is pushed, the process goes to step S205.

FIG. 17 shows the GUI of the cursor button orientation changing screen displayed in step S204.

The GUI shown in FIG. 17 includes the image areas D15 and D16, and a text area T12 displaying a message for prompting the user to select one of the five-button images in the image areas D15 and D16 in which the up, down, left, and right directions are assigned to four suitable cursor buttons.

In step S205, the setting tool P assigns the up, down, left, and right directions to the four cursor buttons as indicated by the five-button image 1202 in the image area D15 or D16 selected by the user. In FIG. 17, if the user pushed the center button 202e when the cursor C2 is at the image area D16, the setting tool P assigns the up direction to the cursor button (down button) 202c, the down direction to the cursor button (up button) 202a, the left direction to the cursor button (right button) 202b, and the right direction to the cursor button (left button) 202d.

By the process of step S205, the orientation of the cursor buttons is changed, and the cursor button orientation change wizard is ended. The setting tool P records the results of assignment into the setting file F through the wearable device setting service S1.

The GUIs of the cursor button orientation changing screen shown in FIGS. 16 and 17 may include a message indicating that the cursor button orientation change wizard is cancelled by a long-pressing of the center button 202e.

Note that the setting tool P may display an image area displaying the five-button image indicating that the four directions are assigned to the four cursor buttons such as the five-button image in the image area D16 before ending the cursor button orientation change wizard.

Further, the setting tool P may scroll the image areas D11, D12, D13, and D14 of FIG. 16, or the image areas D15 and D16 of FIG. 17, for example, when they cannot be displayed on one screen of the display device 124.

In the second embodiment, the setting tool P changes the orientation of the cursor buttons by presenting the five-button images indicating combinations of the assignment of the directions to the cursor buttons to the user in a predetermined order, and prompting the user to select one of the five-button images through the cursor button orientation change wizard. Since the user can know the combinations of the assignment in advance, the user's convenience is improved.

Note that in the second embodiment, while it has been described that the left and right directions are assigned after the up and down directions are assigned, the order of assignment may be reversed.

Further, while a character string indicating the assigned direction is displayed within a button image of each cursor button as shown in FIGS. 16 and 17, the character string may be displayed near each cursor button image as in the first embodiment.

Note that a case where the number of cursor buttons is four has been explained as an example. However, the above cursor button orientation changing process may also be applied when the number of cursor buttons is other than four.

Third Embodiment

In the third embodiment, another modification of the cursor button orientation changing process using the cursor button orientation change wizard will be explained. Since the structures of the mobile PC 16 and the wearable device body 24 are the same as those described in the first and second embodiments, explanation of these structures is omitted.

Figure 18:
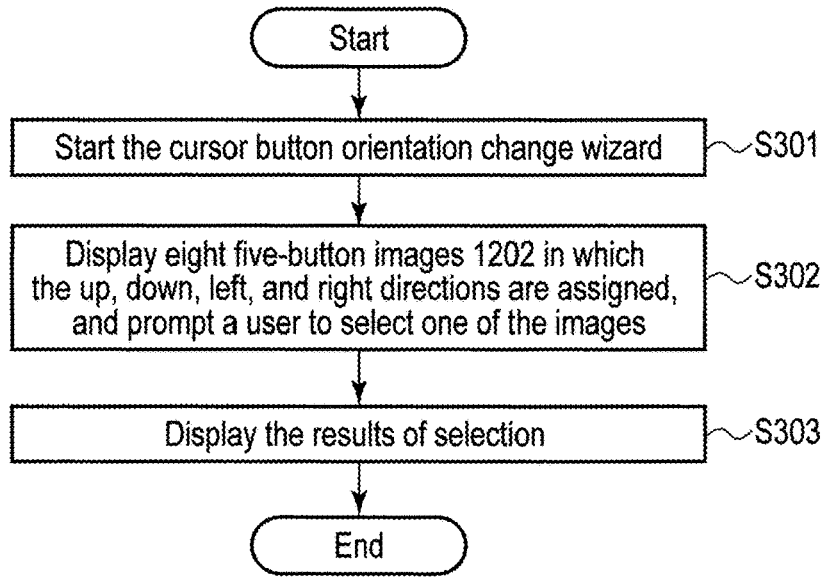
FIG. 18 is a flowchart showing an example of the cursor button orientation changing process according to a third embodiment.

FIG. 18 is a flowchart showing an example of the cursor button orientation changing process in the third embodiment.

Since step S301 is similar to step S101 of FIG. 10, explanation of step S301 is omitted.

Figure 19:
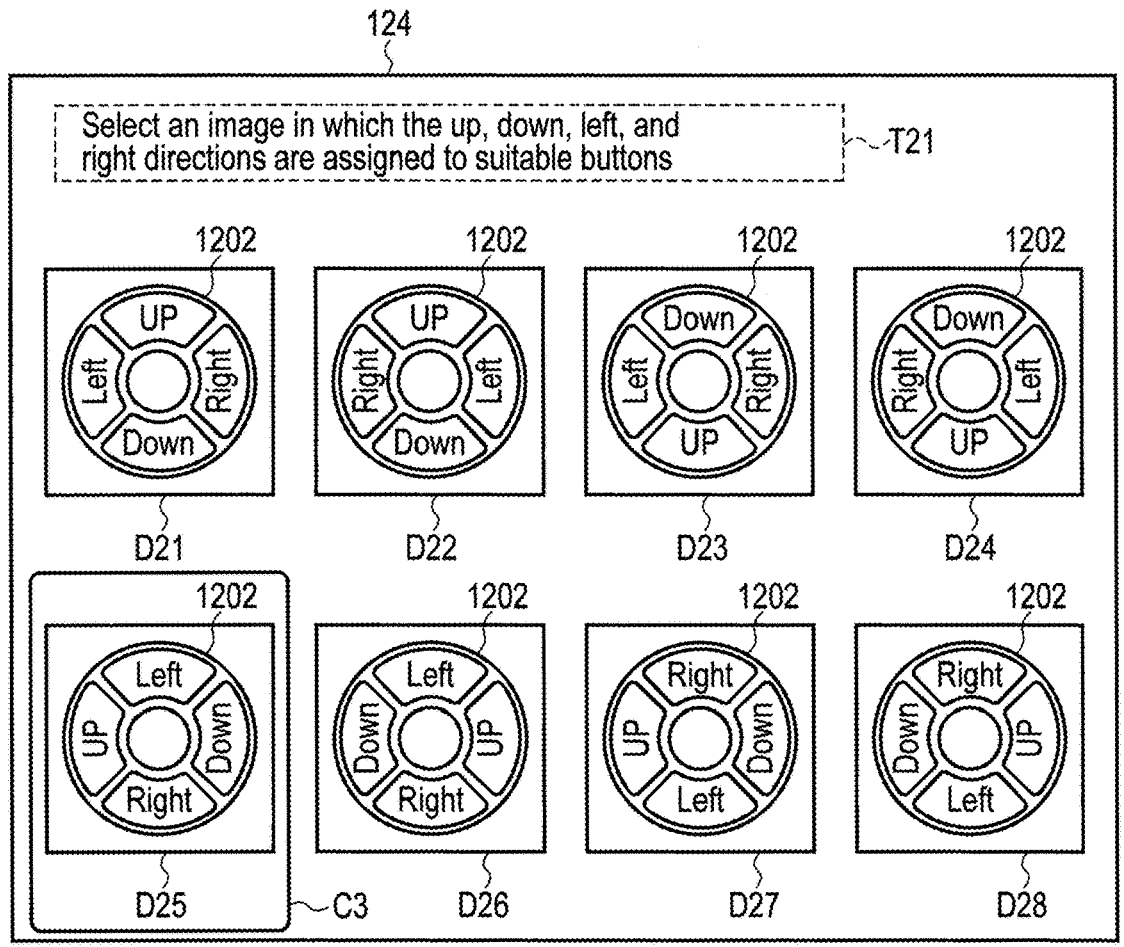
FIG. 19 is an illustration showing an example of the cursor button orientation changing screen according to the third embodiment.

In step S302, the setting tool P displays on the display device 124, eight five-button images 1202 in image areas D21, D22, D23, D24, D25, D26, D27, and D28 as shown in FIG. 19. The five-button images 1202 indicate that the up, down, left, and right directions are assigned to eight combinations of four cursor buttons. In step S302, the setting tool P also prompts a user to select one of the five-button images 1202 in the eight image areas D21, D22, D23, D24, D25, D26, D27, and D28 in which the up, down, left, and right directions are assigned to four suitable cursor buttons. As in step S102, each of the five-button images 1202 is displayed in the default direction in step S302.

The user selects one of the five-button images 1202 in the eight image areas D21, D22, D23, D24, D25, D26, D27, and D28 in which the up, down, left, and right directions are assigned to four suitable cursor buttons, by operating the cursor buttons 202a, 202b, 202c, and 202d to move a cursor C3 on the display device 124. When the center button 202e is pushed, the process goes to step S303.

FIG. 19 shows a GUI of the cursor button orientation changing screen displayed in step S302.

The GUI shown in FIG. 19 includes the image areas D21, D22, D23, D24, D25, D26, D27 and D28, and a text area T12 displaying a message for prompting the user to select one of the five-button images 1202 in the image areas D21, D22, D23, D24, D25, D26, D27, and D28 in which the up, down, left, and right directions are assigned to four suitable cursor buttons.

In step S303, the setting tool P assigns the up, down, left, and right directions to the four cursor buttons as indicated by the five-button image 1202 in the image area D21, D22, D23, D24, D25, D26, D27, or D28 selected by the user. In FIG. 19, if the user pushed the center button 202e when the cursor C3 is at the image area D25, the setting tool P assigns the up direction to the cursor button (left button) 202d, the down direction to the cursor button (right button) 202b, the left direction to the cursor button (up button) 202a, and the right direction to the cursor button (down button) 202c.

By the process of step S303, the orientation of the cursor buttons is changed by a single selection, and the cursor button orientation change wizard is ended. The setting tool P records the results of assignment into the setting file F through the wearable device setting service S1.

The GUI of the cursor button orientation changing screen shown in FIG. 19 may include a message indicating that the cursor button orientation change wizard is cancelled by a long-pressing of the center button 202e.

Note that the image areas D21, D22, D23, D24, D25, D26, D27, and D28 may be scrolled on the display device 124 as in the second embodiment.

In the third embodiment, the setting tool P changes the orientation of the cursor buttons by presenting the five-button images indicating all combinations of the assignment of the directions to the cursor buttons to the user in a predetermined order, and prompting the user to select one of the five-button images through the cursor button orientation change wizard. Since the user can know the all combinations of the assignment in advance, the user's convenience is improved.

Note that a case where the number of cursor buttons is four has been explained as an example. However, the above cursor button orientation changing process may also be applied when the number of cursor buttons is other than four.

Further, the five buttons 202 may be replaced with a cross key button having up, down, left, and right keys and a center key.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
cursor buttons that include a first cursor button and a second cursor button; and
a processor that prompts a user to a push one of the first cursor button and the second cursor button for issuing a command corresponding to a first direction, wherein
when the first cursor button is pushed by the user, the processor assigns the first direction to the pushed first cursor button and a second direction to the second cursor button,
when the second cursor button is pushed by the user, the processor assigns the first direction to the pushed second cursor button and the second direction to the first cursor button,
the processor issues a command corresponding to the first direction when a first assigned button is pushed, the first assigned button being the first or second cursor button to which the first direction is assigned, and
the processor issues a command corresponding to the second direction when a second assigned button is pushed, the second assigned button being the first or second cursor button to which the second direction is assigned.

2. The electronic device of claim 1, further comprising:
a display that displays a first image area indicating the first cursor button, a second image area indicating the second cursor button, and a message prompting the user to select one of the first cursor button or the second cursor button as the first direction, wherein
the display displays a first indicator indicating that the first direction is assigned to the first cursor button within the first image area or at a place near the first image area, and a second indicator indicating that the second direction is assigned to the second cursor button within the second image area or at a place near the second image area when the first cursor button is selected.

3. The electronic device of claim 2, further comprising:
a first device comprising the display; and
a second device comprising the first cursor button, the second cursor button, and the processor.

4. The electronic device of claim 3, wherein the first device comprises an eyeglasses-type wearable device, and the second device comprises a portable type personal computer.

5. The electronic device of claim 1, wherein the processor determines that the firstcursor button is selected when the first cursor button is pushed by the user.

6. The electronic device of claim 1, further comprising:
a third cursor button; and
a fourth cursor button arranged opposite to the third cursor button, wherein
the second cursor button is arranged opposite to the first cursor button, and
the processor,
after performing a first assignment process that assigns the first direction to the first cursor button and the second direction to the second cursor button,
prompts the user to select a button for issuing a command corresponding to a third direction by selecting one of the third cursor button or the fourth cursor button, and
performs a second assignment process that assigns the third direction to the third cursor button and a fourth direction to the fourth cursor button when the third cursor button is selected.

7. The electronic device of claim 6, further comprising:
a display that displays a first image area indicating the first cursor button, a second image area indicating the second cursor button, a third image area indicating the third cursor button, a fourth image area indicating the fourth cursor button, and a message prompting the user to select one of the first cursor button or the second cursor button as the first direction and to select one of the third cursor button or the fourth cursor button as the third direction, wherein
the display displays a first indicator indicating that the first direction is assigned to the first cursor button within the first image area or at a place near the first image area, and a second indicator indicating that the second direction is assigned to the second cursor button within the second image area or at a place near the second image area after the first assignment process is performed, and
the display displays a third indicator indicating that the third direction is assigned to the third cursor button within the third image area or at a place near the third image area, and a fourth indicator indicating that the fourth direction is assigned to the fourth cursor button within the fourth image area or at a place near the fourth image area after the second assignment process is performed.

8. An electronic device comprising:

a first cursor button;

a second cursor button arranged opposite to the first cursor button;

a third cursor button;

a fourth cursor button arranged opposite to the third cursor button; and a processor that displays first image areas each showing graphical images of two of the first cursor button, the second cursor button, the third cursor button, or the fourth cursor button together with graphical images of a first direction and a second direction that are to be differently assigned to the two of the first cursor button, the second cursor button, the third cursor button, or the fourth cursor button, performs a first assignment process that assigns the first direction and the second direction to the two of the first cursor button, the second cursor button, the third cursor button, or the fourth cursor button shown by one of the first image areas selected by a user, displays second image areas each showing graphical images of remaining two of the first cursor button, the second cursor button, the third cursor button, or the fourth cursor button which are not assigned by the first assignment process together with graphical images of a third direction and a fourth direction that are to be differently assigned to the remaining two of the first cursor button, the second cursor button, the third cursor button, or the fourth cursor button, and performs a second assignment process that assigns the third direction and the fourth direction to the remaining two of the first cursor button, the second cursor button, the third cursor button, or the fourth cursor button shown by one of the second image areas selected by the user, issues a command corresponding to the first direction when a first assigned button is pushed, the first assigned button being one of the first cursor button, the second cursor button, the third cursor button, or the fourth cursor button to which the first direction is assigned, issues a command corresponding to the second direction when a second assigned button is pushed, the second assigned button being one of the first cursor button, the second cursor button, the third cursor button, and the fourth cursor button to which the second direction is assigned, issues a command corresponding to the third direction when a third assigned button is pushed, the third assigned button being one of the first cursor button, the second cursor button, the third cursor button, and the fourth cursor button to which the third direction is assigned, and issues a command corresponding to the fourth direction when a fourth assigned button is pushed, the fourth assigned button being one of the first cursor button, the second cursor button, the third cursor button, and the fourth cursor button to which the fourth direction is assigned.

9. A control method for an electronic device comprising cursor buttons that include a first cursor button and a second cursor button, and a processor, the control method comprising:

prompting, by the processor, a user to a push one of the first cursor button and the second cursor button for issuing a command corresponding to a first direction;

when the first cursor button is pushed by the user, assigning, by the processor, the first direction to the pushed first cursor button and a second direction to the second cursor button;

when the second cursor button is pushed by the user, assigning, by the processor, the first direction to the pushed second cursor button and the second direction to the first cursor button, issuing, by the processor, a command corresponding to the first direction when a first assigned button is pushed, the first assigned button being the first cursor button or the second cursor button to which the first direction is assigned; and issuing, by the processor, a command corresponding to the second direction when a second assigned button is pushed, the second assigned button being the first cursor button or the second cursor button to which the second direction is assigned.

* * * * *